Aug. 19, 1941.　　　　S. CLAUSEN　　　　2,253,169
HEAD TRIMMER
Filed May 23, 1936　　　3 Sheets-Sheet 1

INVENTOR
Sigurd Clausen
BY
George S. Hastings
ATTORNEY

Aug. 19, 1941.   S. CLAUSEN   2,253,169
HEAD TRIMMER
Filed May 23, 1936   3 Sheets-Sheet 2
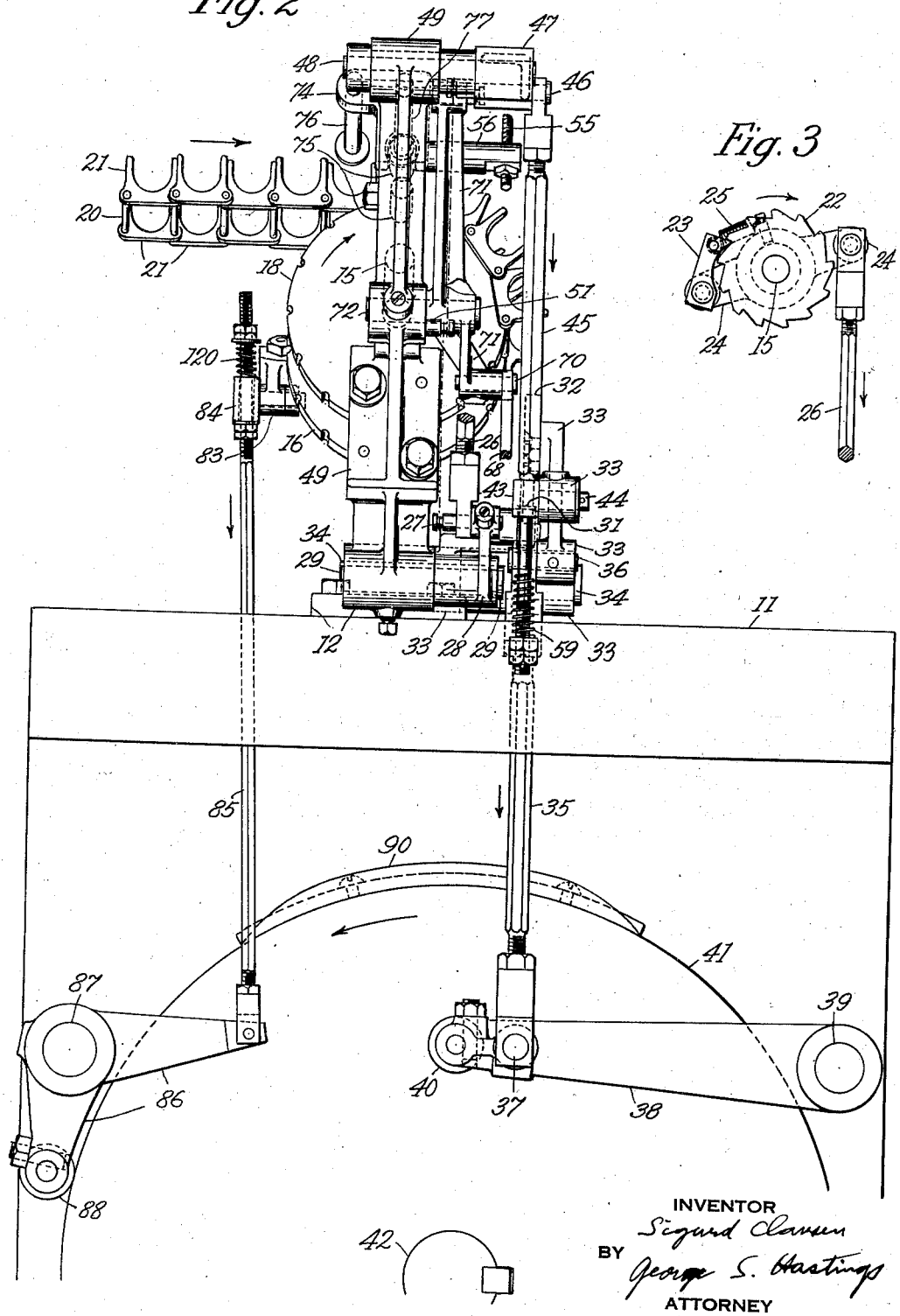
INVENTOR
Sigurd Clausen
BY George S. Hastings
ATTORNEY

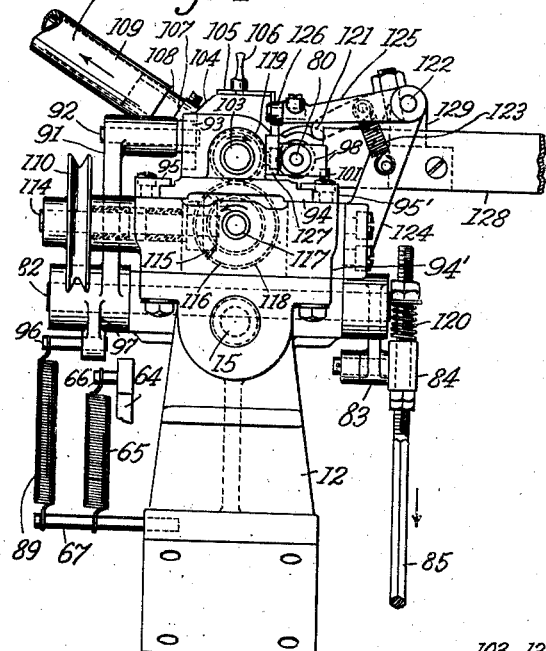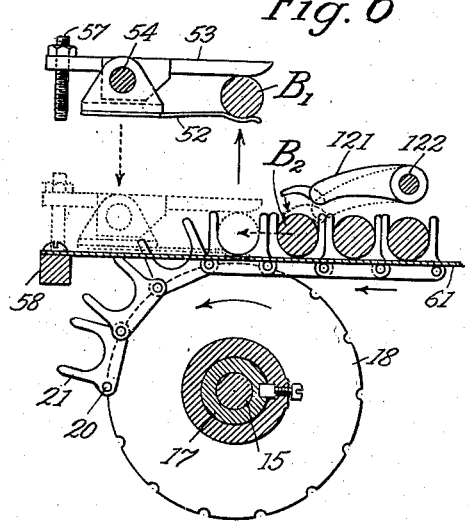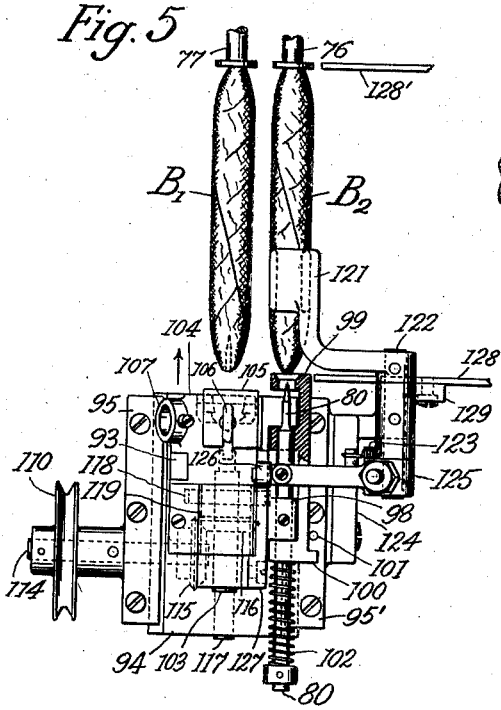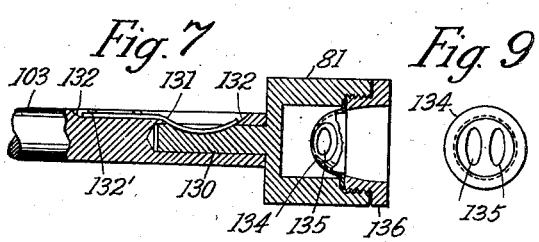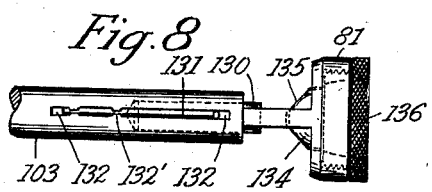

Patented Aug. 19, 1941

2,253,169

UNITED STATES PATENT OFFICE 2,253,169

HEAD TRIMMER

Sigurd Clausen, Brooklyn, N. Y., assignor to International Cigar Machinery Company, a corporation of New Jersey Application May 23, 1936, Serial No. 81,402

13 Claims. (Cl. 131—91)

This invention relates to cigar machines, more particularly to cigar bunch head treating and trimming mechanism.

In the formation of cigars, especially of the molded rolled type, it has been found that a large percentage of the bunches removed from the molds have relatively hard tips. This feature, which is a disadvantage and a problem inasmuch as it causes difficulty in cutting or biting off the cigar head tip before smoking, is due primarily to the molding process to which cigar bunches transferred from the rolling device are subjected. During the molding operation the tobacco at and adjacent the head end is compacted more than that along the length of each bunch length into a hard tip which must be modified, and substantially softened before satisfactory cigars can be made from these bunches. After this step, each bunch is conducted to a trimming station where any excess tobacco is trimmed from the bunch heads, and they are brought to final shape prior to wrapping. In order to more effectively carry out these operations, means are associated with these devices for positively removing scrap issuing from the trimming means.

It is therefore, an object of this invention to provide an improved mechanism for operating upon the heads of cigar bunches. It is a further object of this invention to provide mechanism which will operate upon the tips of cigar bunches and remove therefrom any hardness that may be present.

In the embodiment shown, this object is achieved by providing two stations along the conveyor which carries bunches from the forming molds, at the first of which the hard center tip formed by the pressing together of the two halves of the bunch mold is modified either by being split open by a piercing member or by other suitable means entering the bunch head; while at the second station the modified head is trimmed to shape by the cutting edges of a rotating trimming tool which is moved into contact with the bunch head. While the drawings show the piercing tool positioned to operate upon a bunch head before the trimmer, it is contemplated that these members may have their positions interchanged, if it be desired, but in the best mode of carrying out the principle of the invention, the bunch head tip is trimmed after being pierced. It is a further object to provide improved devices for modifying the head ends of cigar bunches, and trimming them to final shape for wrapping. It is an additional object to provide means for modifying the hard tips of cigar bunches, means for locating such bunches relative to said means prior to its operation, and a device for trimming the ends of said bunches to final size prior to wrapping. It is a further object to provide a combination of devices for operating upon the heads of cigar bunches, said devices comprising means for treating bunch tips, trimming means and suction means for removing scrap from said trimming means. It is also an object of this invention to furnish means for holding bunches undergoing tip treatment against movement during that operation. It is a further object to provide a transfer member for transferring treated bunches from the treating stations to another part of the machine or to a different machine for additional cigar forming operations.

With these and other objects not specifically mentioned in view, the invention consists in certain constructions and combinations hereinafter fully described and then specifically set forth in the claims hereunto appended.

In the accompanying drawings:

Fig. 2 is an end elevation of the same, on line 2—2 of Fig. 1;

Fig. 3 is an end elevation of the conveyor drive, on line 3—3 of Fig. 1;

Fig. 4 is an end elevation of the head trimmer, on line 4—4 of Fig. 1;

Fig. 5 is a top view of the same, from line 5—5 of Fig. 1;

Fig. 6 is a cross-section on line 6—6 of Fig. 1;

Fig. 7 is a cross-section of the trimming tool shown in Fig. 1;

Fig. 8 is a side view of the same; and

Fig. 9 is an end view of the trimming thimble shown in Figs. 7 and 8.

Figure 1:
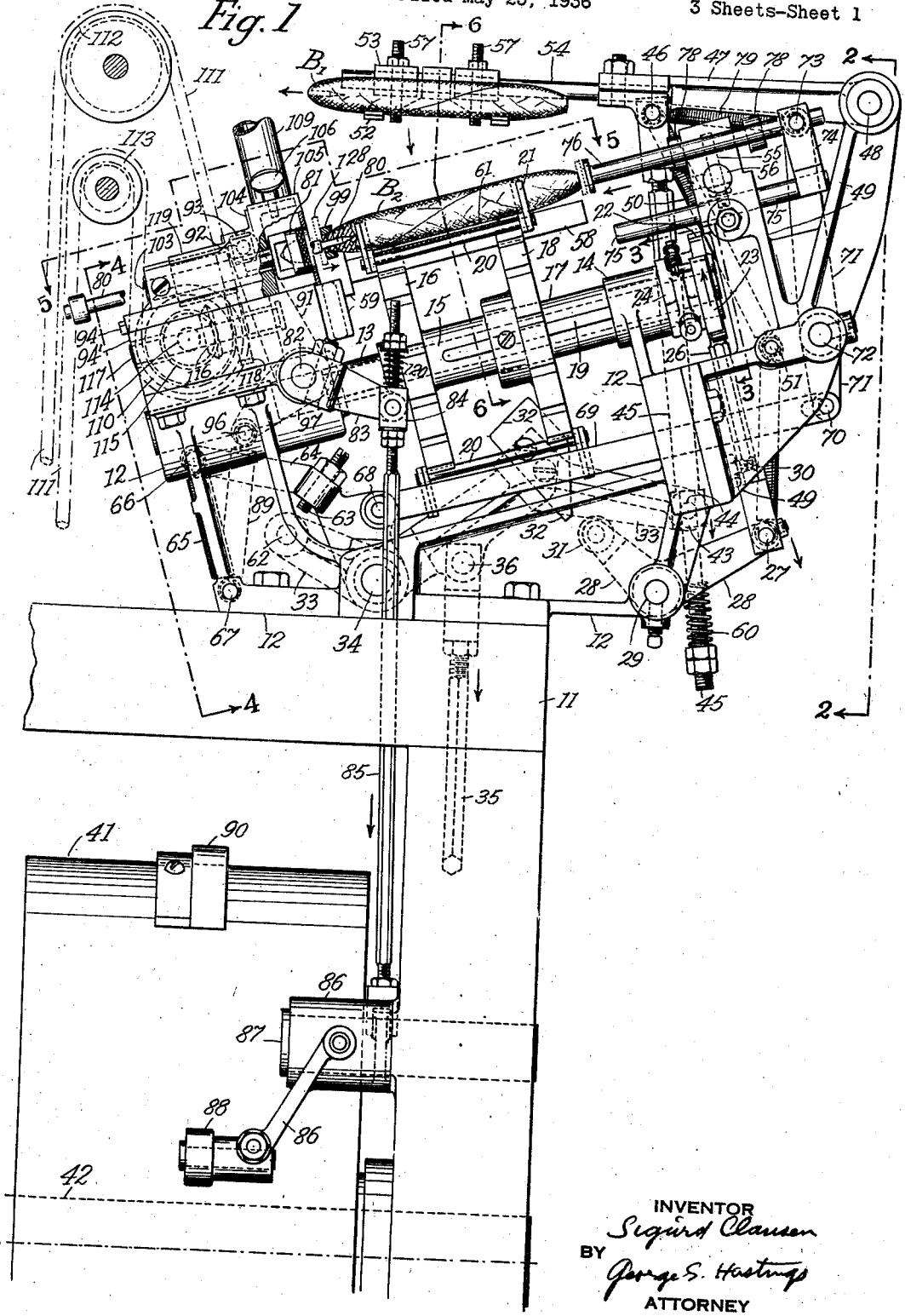
Fig. 1 is a side elevation of the improved bunch-head trimming device.

Referring to Figs. 1 to 3, the base plate 11 of the cigar bunch machine supports a frame 12, in bearings 13 and 14 of which is supported a shaft 15 carrying a fixed sprocket 16 on the hub 17 of which an adjustable sprocket 18 is mounted by means of a long key 19, these sprockets driving an endless chain 20 having pocket-shaped links 21 which convey the cigar bunches from the forming molds to the trimming stations. The shaft 15 is intermittently rotated by a ratchet 22 with which engages a pawl 23 pivoted on an arm 24, loose on shaft 15, and held on the ratchet by a spring 25, the arm 24 being actuated by a rod 26 connected by a pivot 27 to a bell crank lever 28 fulcrumed on a stud 29 in frame 12 and held by a spring 30 attached to pivot 27. The lever 28 carries a roller 31 in the path of an indexing cam 32 attached to a lever 33 fulcrumed on a stud 34 in frame 12 and actuated by a rod 35 attached to a pivot 36 and connected to a pivot 37 in cam lever 38 swinging on a shaft 39 and having a roller 40 in engagement with a track of a cam 41 on the main shaft 42 of the machine.

In the upper position of rod 35, a collar 43 turnable on a shank 44 carried by indexing arm 33 holds up a shouldered rod 45 attached by a pivot 46 to an arm 47 fulcrumed on a stud 48 in a bracket 49 mounted on frame 12 and tensioned by a spring 50 attached to a post 51 in bracket 49. As the rod 35 is depressed by cam 41, the collar 43 is carried downward by arm 33, hence the spring 50 causes the arm 47 to descend, thereby bringing fingers 52 and 53 attached to a rod 54 carried by arm 47 into registration with conveyor chain 20, see dotted lines in Fig. 6, so that a bunch arriving in top-position on sprockets 16 and 18 enters between the fingers 52 and 53. A stop screw 55 carried by a stud 56 fastened in bracket 49 limits the motion of arm 47. On the downward motion of arm 47, the stop screws 57 in fingers 53 engage with a bar 58 carried by a bracket 59 on frame 12, thereby swinging the fingers 53 on rod 54 toward fingers 52, and clamping the bunch which by this time has been advanced into operating position by the indexing of the conveyor chain. The collar 43 during this tightening motion depresses a spring 60 adjustably held on the lower end of rod 45, the engagement of arm 47 with stop screw 55 stopping the action of spring 60 on the bunch. To the rod 58 is attached one end of a long stationary metal strip 61 passing over the cross pins of conveyor chain 20 and serving as a support for the moving bunches. The tips of fingers 52 rest on this metal strip while the bunch B1 is clamped by the fingers 53. When the index arm 33 then is moved up by cam 41, during the dwell of chain 20, the arm 47 is raised with the trimmed bunch into the position shown in Fig. 1, in which position a transfer, not shown, engages the bunch and carries it to a wrapping device in which a cigar wrapper is applied to the same.

As the indexing arm 33 moves downward, a stud 62 carried by a rearward extension of the same ascends and engages with a stop screw 63 in arm 64 fulcrumed on stud 34, thereby lifting arm 64 against the tension of a spring 65 attached to a post 66 at the end of arm 64 and anchored to a post 67 in frame 12. A pivot 68 in arm 64 is connected by a link 69 with a pivot 70 in a lever 71 fulcrumed on a stud 72 in bracket 49, this lever on a stud 73 in its upper end carrying a slide 74 guided by a rod 75 supported in bracket 49. To the slide 74 are affixed rods 76 and 77 which thus move in the direction of the arrow shown in Fig. 1 when the lever 71 is rocked on the downward motion of rod 35. The rod 77 slides in bracket 49 and has collars 78 which limit the travel of slide 74. The link 69 is slotted at the end attached to pivot 70 so that its motion is lost while the indexing cam turns arm 33 to advance the conveyor chain, but after indexing when the bunches have been forwarded to their new positions, the slot engages with pivot 70, and the lever 71 which is tensioned by a spring 79 moves the slide 74 forward, thus axially positioning the two foremost bunches B1 and B2 when they are at the two operating stations of the trimming device. At the first station, the bunch B2 is pierced by a needle 80, while at the second station the pierced bunch B1 is trimmed to shape by a trimming tool 81.

Referring to Figs. 1, 2, 4 and 5, the frame 12 supports a shaft 82 at one end of which is clamped a crank arm 83 having a pivot 84 connected by a rod 85 to a cam lever 86 fulcrumed on a stud 87 and having a roller 88 held by a spring 89 on the circumference of cam 41, the roller 88 being engageable with a cam piece 90 attached to cam 41. The other end of shaft 82 carries a bell crank lever 91 the free end of which by a pivot 92 is attached to a block 93 inserted into a slide 94 held to a support 94' on frame 12 by guide rails 95, 95', the spring 89 referred to above being anchored to post 67 in frame 12 and hooked to a post 96 in an arm 97 extending from the hub of lever 91.

Coaxially with bunch B2, the slide 94 carries a socket 98 in which is held the piercing needle 80, upon the latter being loosely mounted a bunch locator 99 for centering the bunch on the needle. As the slide 94 moves in the direction of the arrow shown in Fig. 5, the locator 99 engages the bunch B2 and guides the center of the same to the needle 80 until stopped by a nose 100 at the rear of locator 99 engaging a pin 101 in guide rail 95'. The needle 80 upon further movement of slide 94 then enters the bunch while a spring 102 on the needle is compressed against the then stationary bunch locator.

In line with bunch B1 the slide 94 supports a shaft 103 to which is attached the trimming tool 81, the latter being enclosed in a chamber 104 having a removable cover 105 held in place by a thumb screw 106. The chamber 104 has an outlet 107, Figs. 4 and 5, by which it is connected through a nipple 108 to a suction hose 109 which carries away the scrap cut off the bunch head by the trimmer. The trimming tool is rotated by a pulley 110 driven by a belt 111 running over pulleys 112 and 113, the shaft 114 of pulley 110 carrying a bevel gear 115 in mesh with a bevel gear 116 on a shaft 117, Figs. 1, 4 and 5, which has a spur gear 118 in mesh with a wide gear 119 on shaft 103 carrying the trimming tool.

As the slide 94 is moved forward by the lever 91, the locator 99 thus first positions the bunch B2 at the first station and on further forward movement of slide 94 the piercing needle 80 enters the bunch B2 while, at the same time, the trimmer 81 at the second station trims the head of bunch B1 which has been pierced at the first station in the preceding cycle of the machine. The forward movement of slide 94 is checked by the engagement of the trimmer with the bunch, the remainder of the downward motion of rod 85 being taken up by a spring 120 adjustably mounted on the upper end of the same, the said spring acting as a yielding member of the trimming tool.

While being pierced, the bunch at station B2 is held by a clamp arm 121 mounted on a shaft 122 tensioned by a spring 123 fastened to a bracket 124 on support 94'. The shaft 122 has an arm 125 carrying a roller 126 which rests on a cam piece 127 on slide 94, this cam-piece, which may be integral with socket 98, permitting the arm 125 and, with it, the clamp arm 121 to drop after the bunch has been positioned by the locator 99, the clamp 121 then holding the bunch against the metal strip 61, see Fig. 6.

After the slide 94 has been moved back into its starting position by the lever 91, the bunch B1 is taken out of the conveyor chain by the upward movement of lifter arm 47 which returns into receiving position as soon as a transfer provided for this purpose has removed the trimmed bunch from the same, and the just-pierced bunch B2 is then advanced into the trimming station. While traveling on the conveyor chain 20, the cigar bunches are guided by end strips 128 and 128', one end of the strip 128 being fastened to an extension 129 of bracket 124. Strip 128' is also suitably mounted on brackets on the machine frame (not shown) and is adjustable thereon relatively to strip 128 in order that the machine may be capable of handling different length bunches.

The trimming tool, Figs. 7 to 9, consists of a holder 81, the shank 130 of which is inserted into a bore of shaft 103 and held therein by a wire spring 131 fastened in an axial slot 132 of shaft 103 by peening the edges 132' of a portion of slot 132 inward over one end of the spring, the curved other end of which fits into an axial groove cut into shank 130.

Into the free end of holder 81 is inserted a trimming thimble 134 which is made of the shape desired for the bunch head and which is provided with two symmetrical cutting edges 135 formed by grinding the outer surface of the thimble at a proper angle until its shell is penetrated to the required depth. The thimble seat of holder 81 is bored to the exact diameter of the thimble flange so as to assure the proper positioning of the thimble concentric with shaft 103. The thimble is secured in place on the holder seat by a screw cap 136 and thus is readily interchangeable for trimming bunches of different head shapes. A comparatively large clearance is provided between the bottom of thimble 134 and the narrow connecting member of holder 81, thereby preventing jamming and accumulation of scrap during the trimming operation.

The structure described above constitutes a preferred embodiment of the invention but changes and modifications may be made in the construction covered by the invention within the scope of the claims. The invention is not, therefore, to be restricted to the precise details of the structure shown and described.

What is claimed is:

1. In a cigar machine, the combination with a device for moving cigar bunches to a bunch head treating mechanism, of an elongated member mounted adjacent said device for supporting bunches advanced by said device, a bunch head trimmer mechanism, a transfer member resting upon said member and adapted to receive bunches advanced by said device, and support them in operative position with respect to said trimmer, a suction casing partly surrounding said trimmer for removing scrap tobacco cut from successive bunches by said trimmer, and means for moving said transfer member subsequent to said trimming operation to lift a finished bunch out of said device for transfer from said machine.

2. In a cigar machine, the combination with a device for moving cigar bunches to a bunch head treating mechanism, of an elongated member mounted over said device for supporting bunches advanced by said device, a bunch head trimmer mechanism, a transfer member resting upon said elongated member and adapted to receive bunches advanced by said device, and support them in operative position with respect to said trimmer, a suction casing partly surrounding said trimmer for removing scrap tobacco cut from successive bunches by said trimmer, means for moving said transfer member subsequent to said trimming operation to lift a finished bunch out of said device for transfer from said machine, said transfer member comprising a pair of gripper jaws, and adjustable means for limiting the downward movement of said transfer member.

3. In a cigar machine, a bunch head trimmer, a device for advancing cigar bunches to trimming position, and means for moving said trimmer and bunches on said device relative to each other to effect trimming operations, said means comprising mechanism to advance said trimmer into operative relation with a bunch head, and a yieldable connection between said trimmer and said mechanism to press said trimmer against said bunch.

4. In a cigar machine, a bunch head trimmer, a device for advancing cigar bunches to a trimming station, means for moving said trimmer and bunches at said station relative to each other to effect trimming operations, said means including mechanism adapted to advance said trimmer into operative relation with a bunch head, and yieldable connections between said trimmer and mechanism for pressing said trimmer against said bunch, and a suction casing partly surrounding said trimmer for removing scrap cut by said trimmer from bunch heads.

5. The combination with a device for supporting cigar bunches having partially formed heads, of a movable support, a bunch tip locator, a bunch tip softener and a bunch head trimmer mounted on said support, means for producing relative movement of bunches on said device and said support whereby said locator, softener and trimmer are brought into operative functional relationship with heads of the bunches for softening and reducing the same to final condition and shape.

6. The combination with a device for supporting cigar bunches having partially formed heads, of a movable support located adjacent said device, a modifying member and a trimmer mounted on said support for treating the head ends of said bunches, a casing located partly around said trimmer and provided with an opening, means connected to said opening for creating a suction in said casing to remove scrap trimmed from the modified cigar bunch heads by said trimmer, and means for moving said support relative to said bunches on said device for establishing an operative functional relationship between said modifying member and trimmer on the support and the bunches on said device.

7. A mechanism for bringing cigar bunch heads to final shape, comprising a support, a slide member carried on said support and adapted to move to and from bunches to be shaped, bunch head treating devices carried by said member including a bunch softening tool, and a bunch head trimmer, means for rotating said trimmer to remove excess tobacco from heads of bunches and reduce them to final form, and means to automatically actuate the softening tool to soften a bunch during the trimming operation.

8. In a device for bringing cigar bunch heads to final form, the combination with a support, of a slide mounted on said support, a bunch head locator, a bunch head softener, a trimmer device carried by said slide to shape softened bunches, means for moving said slide to and from operative position with respect to bunch heads to be treated and shaped, said locator being carried by said slide in coaxial relation to said softener to engage and center a bunch head with respect to said softener, and means to automatically actuate the bunch head softener to soften a bunch during the trimming operation.

9. The combination with a plurality of bunch head finishing stations which successively soften and shape heads of bunches, of a device for transporting successive bunches to said stations, a support positioned adjacent said stations and extending over said device for supporting said bunches while they are at said stations, a transfer mechanism resting upon said support adjacent the last station into which bunches are moved, and means for operating said mechanism to remove said bunches after completion of said finishing operations.

10. The combination with a bunch head manipulating station, of a device for conveying cigar bunches to said station, means located adjacent thereto and extending beneath bunches on said device for supporting said bunches at said station, transfer mechanism receiving said bunches at said station, means for moving said mechanism therefrom following manipulation of the heads of bunches at said station, and means carried by said transfer moving means for indexing said device forward to feed successive bunches to said station after the downward movement of said transfer mechanism into bunch receiving position.

11. The combination with a bunch head manipulating station, of a device for conveying cigar bunches to said station, means located adjacent thereto and extending beneath bunches on said device for supporting said bunches at said station, transfer mechanism receiving said bunches at said station, means for moving said mechanism therefrom following manipulation of the heads of bunches at said station, means carried by said transfer moving means for indexing said device forward to feed successive bunches to said station after the downward movement of said transfer mechanism into bunch receiving position, and adjustable means for limiting the downward movement of said mechanism, said adjustable means comprising a stop screw and a stud into which said stop screw is threaded in a position to engage said transfer mechanism.

12. The combination with a device for supporting molded cigar bunches having hard tips on their heads, of a member for piercing said tips to remove therefrom any hardness that may exist, a bunch head shaped trimmer having symmetrical internal shearing edges to circumferentially shear excess tobacco from said tips and give the bunch heads final form, a movable support upon which said member and trimmer are mounted, and means for moving said support relative to bunches to be treated to bring said member and trimmer into operative functional relationship thereto.

13. The combination with a device having a pocket for supporting cigar bunches with partially formed heads, of a movable support, a bunch head locator, a bunch tip softening member positioned on said support and adapted to soften the relatively hard tips of cigar bunch heads, said locator being positioned on said support to engage the head end of a bunch in said pocket and locate the same in predetermined position relative to said member, means for producing relative movement between bunches on said device and said support whereby said locator and member are brought into final operative position relative to said bunches, means for clamping said bunches against movement during the operation of said softening member, said means including a clamp adapted to press a cigar bunch transversely against said pocket, and mechanism for actuating said clamp subsequent to the engagement of said locator with the bunch head and prior to the engagement of said softening member with the bunch head.

SIGURD CLAUSEN.